(12) United States Patent
Teng

(10) Patent No.: US 7,460,363 B2
(45) Date of Patent: Dec. 2, 2008

(54) DISPLAY MODULE

(75) Inventor: Cheng-Tsung Teng, Tao Yuan Shien (TW)

(73) Assignee: Techview International Technology Inc., Tao Yuan Shien (TW)

( * ) Notice: Subject to any disclaimer, the term of this patent is extended or adjusted under 35 U.S.C. 154(b) by 302 days.

(21) Appl. No.: 11/501,340

(22) Filed: Aug. 9, 2006

(65) Prior Publication Data

US 2007/0045494 A1 Mar. 1, 2007

(30) Foreign Application Priority Data

Aug. 25, 2005 (TW) .............................. 94129068 A

(51) Int. Cl.
*G06F 1/16* (2006.01)
(52) U.S. Cl. ...................... 361/681; 248/300; 248/125.1
(58) Field of Classification Search ................. 361/681; 248/300
See application file for complete search history.

(56) References Cited

U.S. PATENT DOCUMENTS

| 7,124,984 B2 * | 10/2006 | Yokouchi et al. ......... 248/125.8 |
| 7,168,665 B2 * | 1/2007 | Hong et al. ............... 248/125.1 |
| 2004/0004165 A1 * | 1/2004 | Hong et al. ................. 248/132 |
| 2004/0011932 A1 * | 1/2004 | Duff ............................ 248/157 |
| 2004/0084579 A1 * | 5/2004 | Lee et al. .................. 248/125.1 |
| 2004/0165344 A1 * | 8/2004 | Lee ............................. 361/681 |

* cited by examiner

*Primary Examiner*—Lisa Lea-Edmonds
(74) *Attorney, Agent, or Firm*—Quintero Law Office

(57) ABSTRACT

A display module. The display module includes a connect member and a support base. The support base further includes an outer tube, a holder, an inner tube, and an elastic member. The holder abuts the outer tube, and has an abutting portion and a plurality of rollers, wherein the plurality of rollers roll in the outer tube enabling the holder to slide in the outer tube. The inner tube has a first end and a second end. The first end connects with the connect member, and the second end connects with the holder. The elastic member, disposed in the outer tube, abuts the abutting portion, and supports the holder and the inner tube, allowing the inner tube to remain in any position in the outer tube.

9 Claims, 6 Drawing Sheets

DISPLAY MODULE

BACKGROUND

The invention relates to a display module, and in particular, to a display module with an enhanced support base, which is made of large amount of plastic and is strong enough to uphold the overall structure.

For the design consideration, enhanced structure and convenient operation are both important. In addition to supporting a display device, conventional support bases can extend to adjust the height of the display device. Such conventional support bases use metal sliders and metal tracks, whereby the sliders slide in the tracks allowing the support base to be extended or shortened. However, the large amount of metal used creates increased costs.

SUMMARY

The invention provides a display module in which the structure of the support base of the display module is enhanced. Only a small amount of metal is used in fabricating the support base.

Accordingly, the invention provides a display module. The display module comprises a connect member and a support base. The support base comprises an outer tube, a holder, an inner tube, and an elastic member. The holder abuts the outer tube, and has an abutting portion and a plurality of rollers rolling in the outer tube enabling the holder to slide in the outer tube. The inner tube has a first end connected with the connect member, and a second end connected with the holder. The elastic member, disposed in the outer tube, abuts the abutting portion and supports the holder and the inner tube, allowing the inner tube to remain in any position in the outer tube.

The outer tube has a first rib set and a second rib set. The first rib set abuts the second rib set to prevent the inner tube from twisting in the outer tube.

The first rib set comprises a plurality of first ribs and a plurality of second ribs. The second rib set comprises a plurality of third ribs positioned inside of the plurality of first ribs, and a plurality of fourth ribs positioned outside of the plurality of third ribs.

The plurality of rollers abuts and rolls on the plurality of first ribs.

The support base further comprises a pedestal connected with the outer tube.

The holder further comprises a plurality of E-rings mounting the plurality of rollers on the holder.

The support base further comprises a cover disposed on the outer tube and abutting the inner tube.

The elastic member is a constant force spring.

The outer tube and the inner tube are made of plastic.

DESCRIPTION OF THE DRAWINGS

The invention can be more fully understood by reading the subsequent detailed description and examples with references made to the accompanying drawings, wherein.

DETAILED DESCRIPTION

Figure 1:
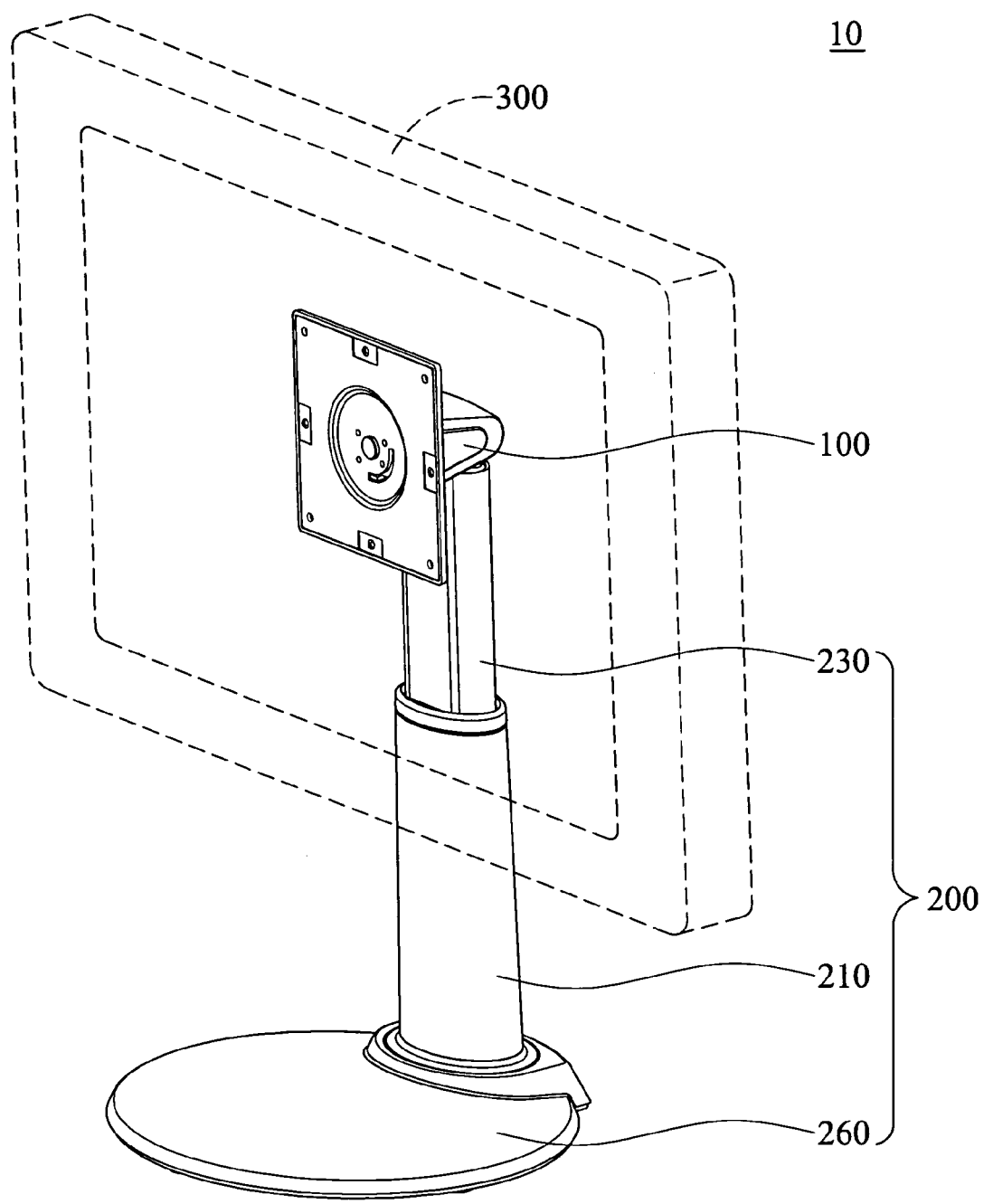
FIG. 1 is a schematic diagram of a display module.
Figure 2:
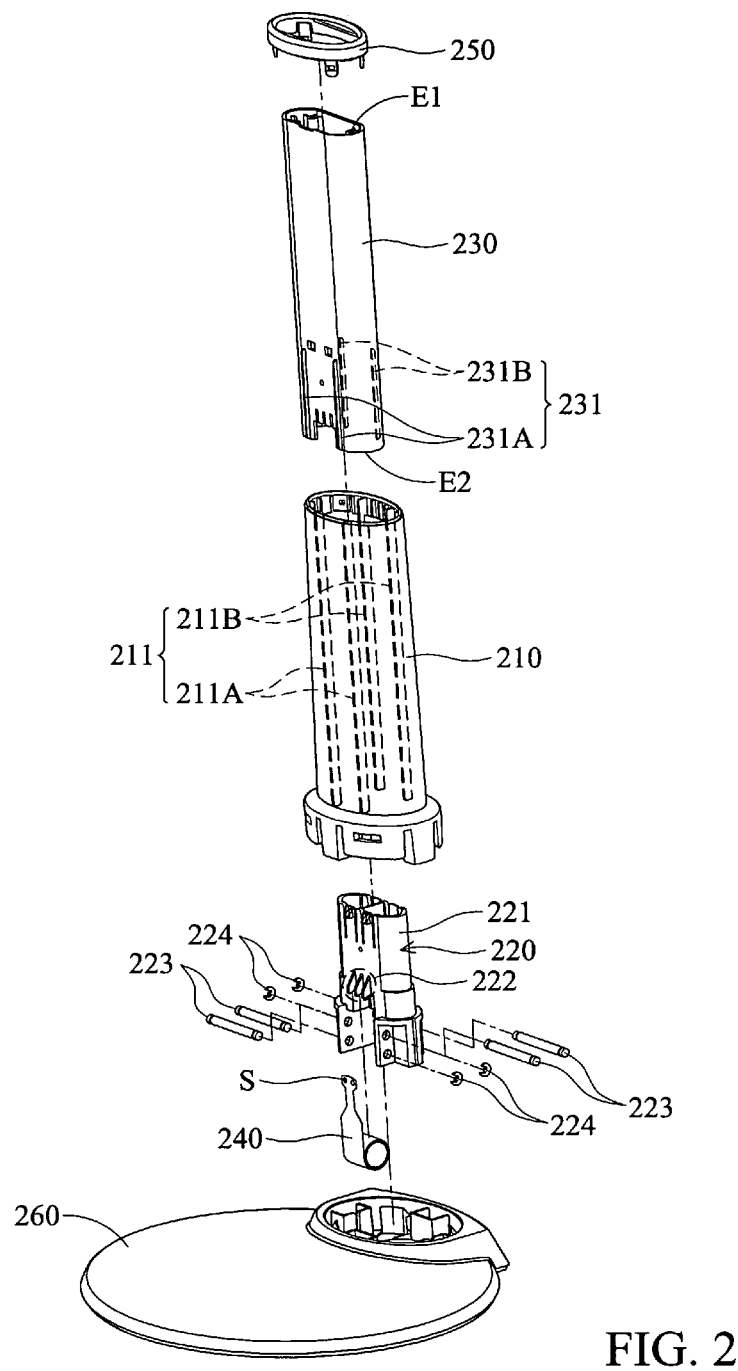
FIG. 2 is an exploded view of a support base.

FIG. 1 is a schematic view of a display module 10 of the invention. FIG. 2 is an exploded view of a support base 200.

FIGS. 3A-3D are sectional views of the display module 10. The display module 10 comprises a connect member 100, a support base 200 and a display panel 300, wherein the connect member 100 connects with the display panel 300.

As shown in FIG. 2, the support base 200 comprises an outer tube 210, a holder 220, an inner tube 230, an elastic member 240, a cover 250, and a pedestal 260.

Figure 3A:
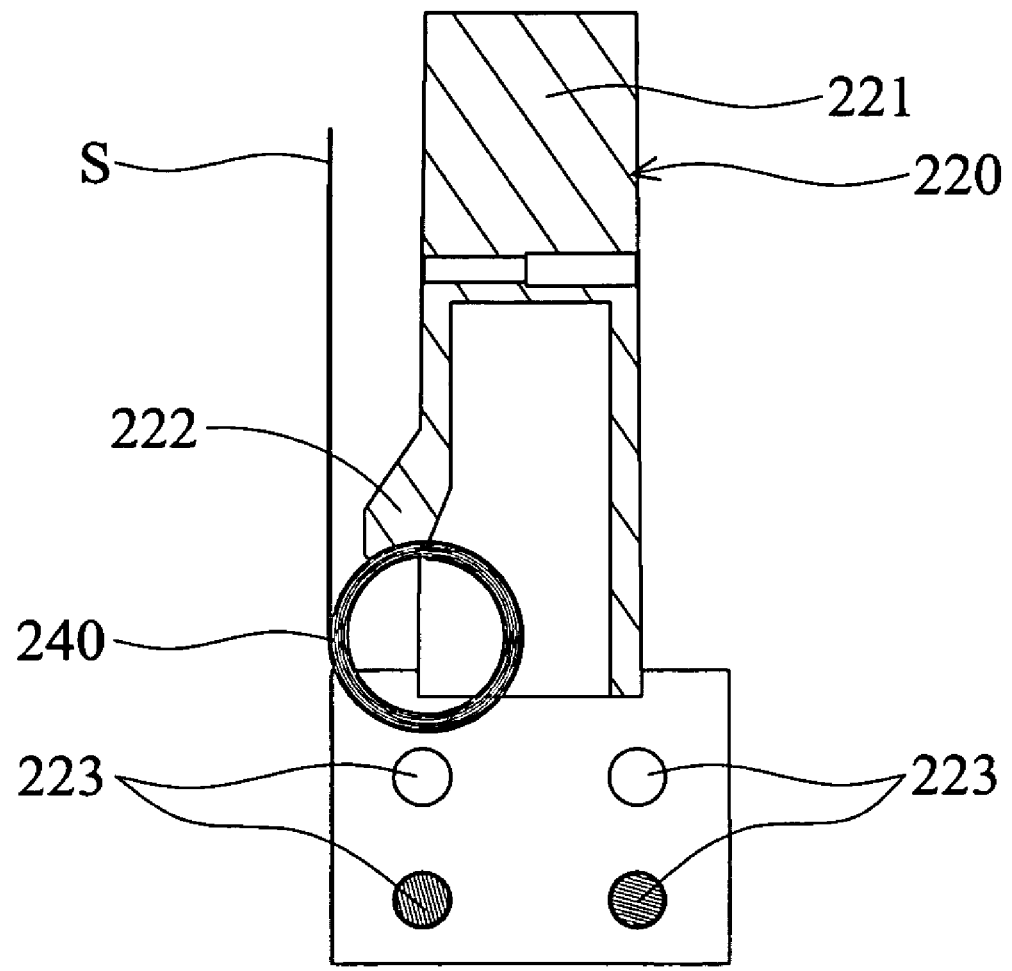
FIGS. 3A-3D are sectional views of the display module.
Figure 3B:
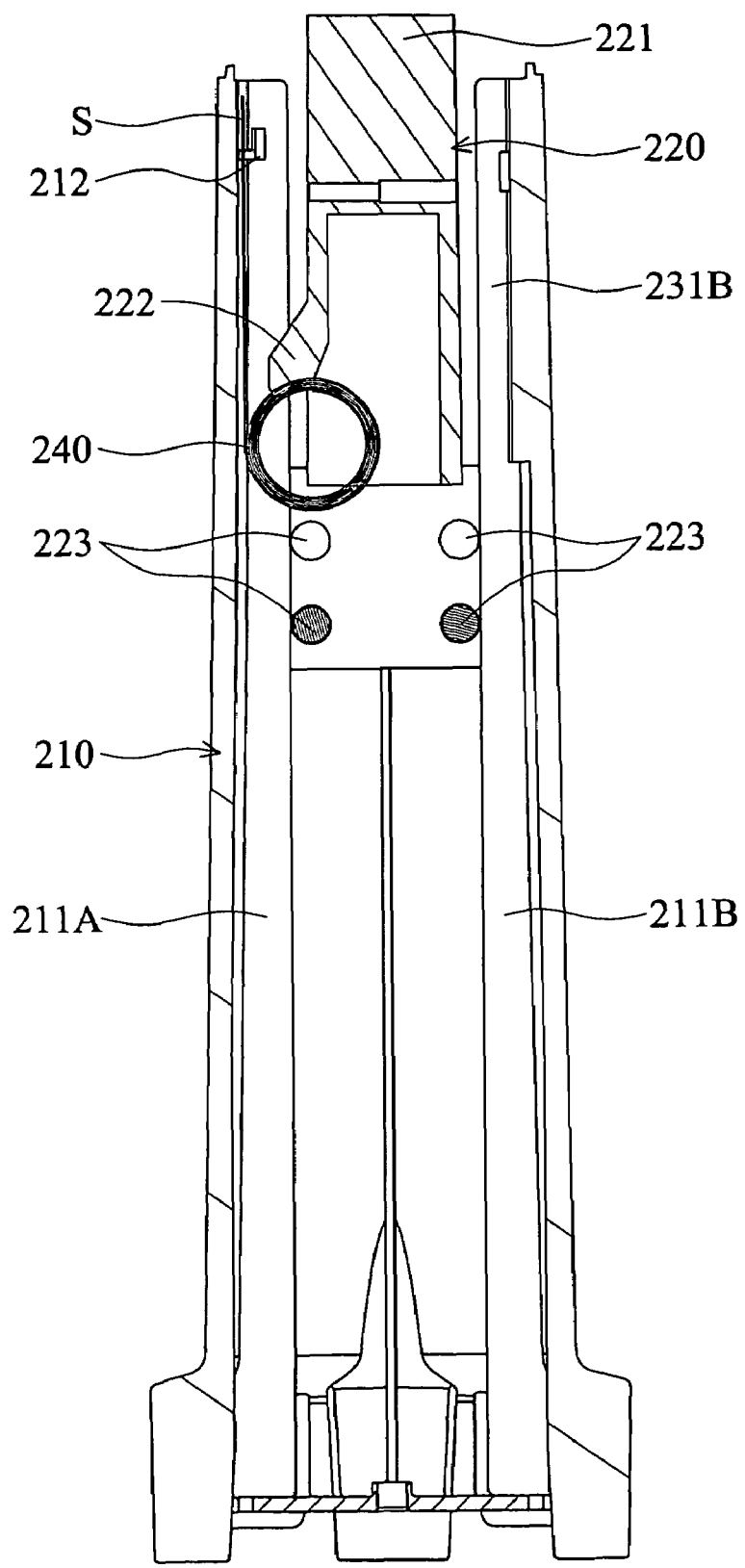

Referring to FIG. 3B, the outer tube 210 is a tubular structure having an upper narrow opening and a lower wide opening. The tube 210 has a first rib set 211 and an engaging portion 212, wherein the first rib set 211 comprises two first ribs 211A and two second ribs 211B.

The holder 220 is disposed in the outer tube 210, comprising a body 221, an abutting portion 222, four metal rollers 223, and four E-rings 224. The diameter of the four rollers 223 is 5 mm. The four rollers 223 are mounted on the body 221 by the four E-rings 224. Thus, when the holder 220 is positioned in the outer tube 210, the rollers 223 abut the first ribs 211A and the second ribs 211B of the outer tube 210 respectively, so that the rollers 223 can roll on the first ribs 221A and the second ribs 221B.

Figure 3C:
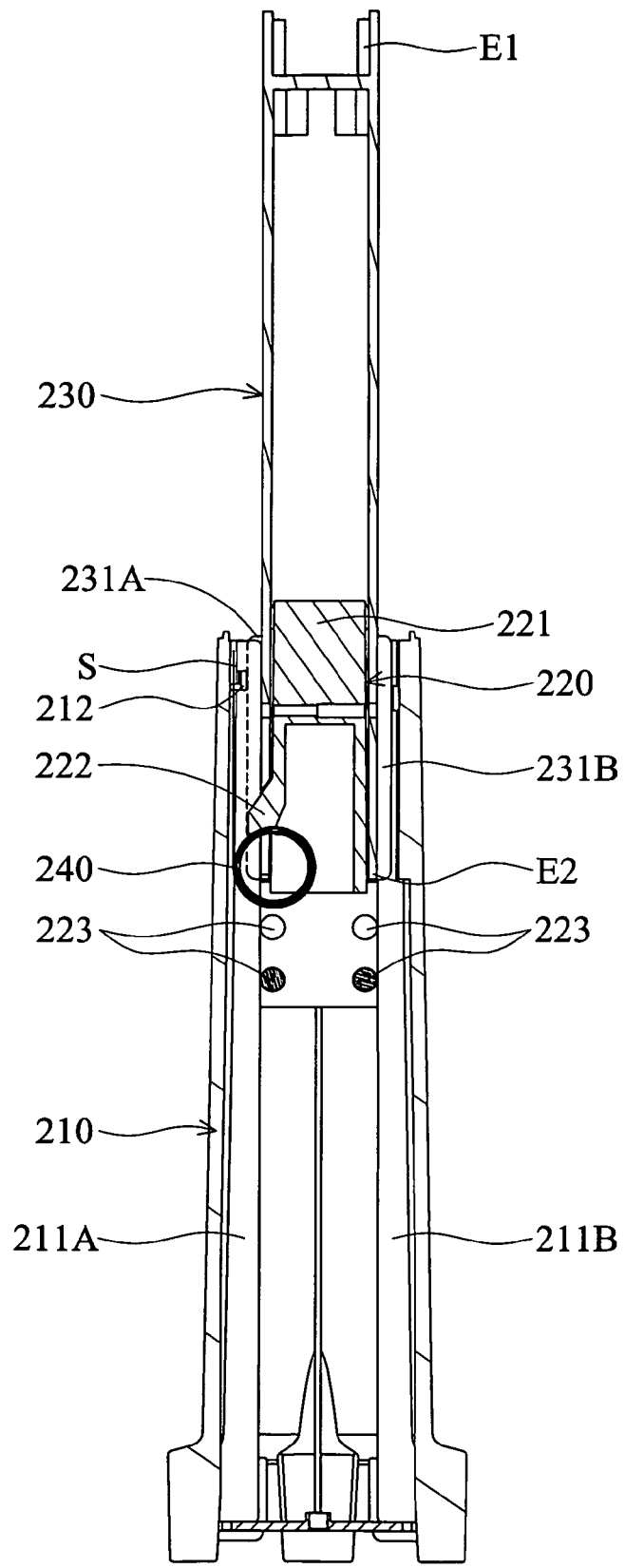

Referring to FIG. 3C, the inner tube 230, disposed in the outer tube 210 has a first end E1, a second end E2, and a second rib set 231, wherein the second rib set 231 comprises two third ribs 231A and two fourth ribs 231B. The first end E1 of the inner tube 230 connects with the connect member 100, and the second end E2 of the inner tube 230 connects with the holder 220. When the inner tube 230 is disposed in the outer tube 210, the first ribs 211A of the outer tube 210 abut the third ribs 231A of the inner tube 230, and the second ribs 211B of the outer tube 210 abut the fourth ribs 231B of the inner tube 230. In addition, the first ribs 211A are positioned outside the third ribs 231A, and the second ribs 211B are positioned inside the fourth ribs 231B, but the disclosure is not limited thereto. Alternatively, the first ribs 211A may be inside the third ribs 231A, and the second ribs 211B outside the fourth ribs 231B.

Referring to FIG. 3A, the elastic member 240 is a constant force spring, having a tip S engaging with the engage portion 212 of the outer tube 210. The elastic member 240 abuts the abutting portion 222 of the holder 220, and supports the holder 220 and the inner tube 230. It should be noted that the elasticity of the elastic member 240 adjusts according to the assigned weight of the display panel such that the inner 230 of the display module 10 can remain in any position in the outer tube 210.

Figure 3D:
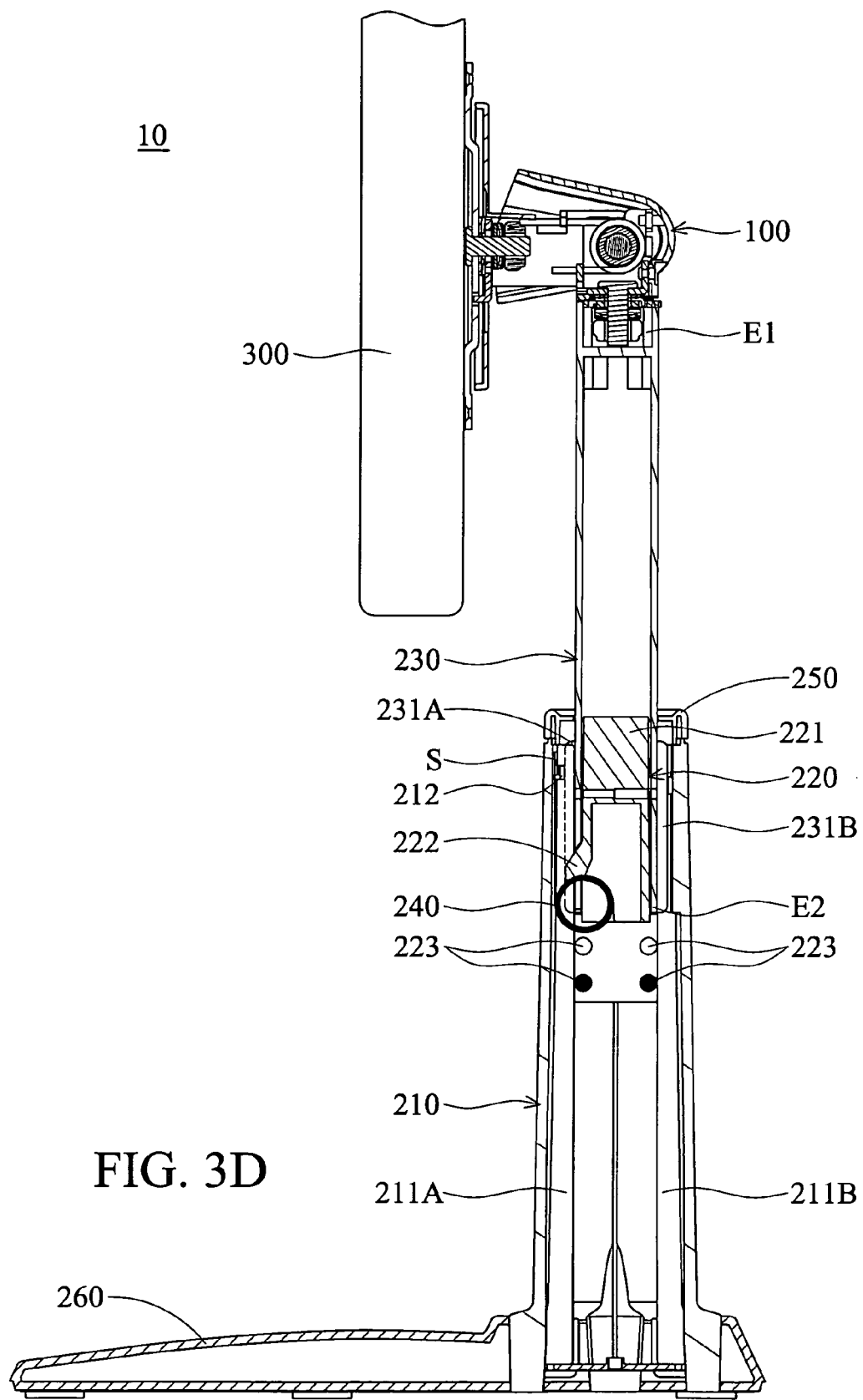

Referring to FIGS. 3A-3D, in fabrication of the display module 10, the elastic member 240 abuts the abutting portion 222 of the holder 220 (as shown in FIG. 3A). Then together the elastic member 240 and the abutting portion 222 are inserted in the outer tube 210 through the lower wide opening. A tool is inserted into the outer tube 210 from the upper narrow opening, pulling the tip S of the elastic member 240 into the engage portion 212 of the outer tube 210 (as shown in FIG. 3B). The inner tube 230 is positioned into the outer tube 210 from the upper narrow opening to connect with the holder 220 (as shown in FIG. 3C). Next, the cover 250 is disposed on the upper narrow opening of the outer tube 210, covering a gap between the outer tube 210 and the inner tube 230. The outer tube 210 connects with the pedestal 260, and the inner tube 230 connects with the connect member 100 (as shown in FIG. 3D).

The display module 10 utilizes the metal roller 223 and plastic rib sets 211, 231 as the main structure to provide strength lacking in plastic material. The overall strength of the support base 200 approximates strength of the conventional support base structured with large amounts of metal. In addition to enhancing the strength and lowering costs, the metal rollers 222 rolling on the rib sets 211, 213 minimize friction produced by adjustment of the height of the display module 10. Not only is noise reduced, but also the scratch marks can be minimized. Further, only the elastic member out of all other members of the structure requires replacement to support different sizes of display panel (eg. 17" or 19").

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display module, comprising:
    a connect member;
    a support base, comprising;
        an outer tube;
        a holder abutting the outer tube, having an abutting portion and a plurality of rollers rolling in the outer tube enabling the holder to slide in the outer tube;
        an inner tube having a first end connected with the connect member, and a second end connected with the holder; and
        an elastic member disposed in the outer tube, abutting the abutting portion and supporting the holder and the inner tube, allowing the inner tube to remain in any position in the outer tube.

2. The display module as claimed in claim 1, wherein the outer tube has a first rib set and a second rib set, and the first rib set abuts the second rib set to prevent the inner tube from twisting in the outer tube.

3. The display module as claimed in claim 2, wherein the first rib set comprises a plurality of first ribs and a plurality of second ribs, and the second rib set comprises a plurality of third ribs positioned inside the plurality of first ribs, and a plurality of forth ribs positioned outside the plurality of third ribs.

4. The display module as claimed in claim 2, wherein the plurality of rollers abuts and rolls on the plurality of first ribs.

5. The display module as claimed in claim 1, wherein the support base further comprises a pedestal connected with the outer tube.

6. The display module as claimed in claim 1, wherein the holder further comprises a plurality of E-rings mounting the plurality of rollers on the holder.

7. The display module as claimed in claim 1, wherein the support base further comprises a cover disposed on the outer tube and abutting the inner tube.

8. The display module as claimed in claim 1, wherein the elastic member is a constant force spring.

9. The display module as claimed in claim 1, wherein the outer tube and the inner tube are plastic.

* * * * *